(12) United States Patent
Kim et al.

(10) Patent No.: US 10,854,010 B2
(45) Date of Patent: Dec. 1, 2020

(54) METHOD AND DEVICE FOR PROCESSING IMAGE, AND RECORDING MEDIUM

(71) Applicant: SAMSUNG ELECTRONICS CO., LTD., Suwon-si (KR)

(72) Inventors: Jung-bum Kim, Seoul (KR);
Soo-ryum Choi, Suwon-si (KR);
Joon-hyun Choi, Suwon-si (KR);
Sang-jun Ahn, Seongnam-si (KR);
Chan-min Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 16/320,894

(22) PCT Filed: Jul. 27, 2017

(86) PCT No.: PCT/KR2017/008107
§ 371 (c)(1),
(2) Date: Jan. 25, 2019

(87) PCT Pub. No.: WO2018/021850
PCT Pub. Date: Feb. 1, 2018

(65) Prior Publication Data
US 2019/0164349 A1    May 30, 2019

(30) Foreign Application Priority Data
Jul. 28, 2016  (KR) .................. 10-2016-0095995

(51) Int. Cl.
*G06T 19/00*  (2011.01)
*G02B 27/01*  (2006.01)
(Continued)

(52) U.S. Cl.
CPC ........ *G06T 19/006* (2013.01); *G02B 27/0172* (2013.01); *G02B 27/0179* (2013.01);
(Continued)

(58) Field of Classification Search
None
See application file for complete search history.

(56) References Cited

U.S. PATENT DOCUMENTS 9,679,223 B2  6/2017  Moon et al.
9,727,996 B2  8/2017  Pandey et al.
(Continued)

FOREIGN PATENT DOCUMENTS

EP          2 966 863 A1   1/2016
KR   10-2009-0053182 A    5/2009
(Continued)

OTHER PUBLICATIONS

Written Opinion (PCT/ISA/237) issued by the International Searching Authority in corresponding International Application No. PCT/KR2017/008107, dated Nov. 2, 2017.
(Continued)

*Primary Examiner* — Frank S Chen
(74) *Attorney, Agent, or Firm* — Sughrue Mion, PLLC

(57) ABSTRACT

Provided is a method, performed by a device, of processing an image, the method including tracking a movement of a user wearing the device and generating movement information of the user, the movement information being about a movement occurring between a previous time when a first image was rendered and a current time when a second image is rendered; selecting at least one pixel from among a plurality of pixels comprised in the first image, based on the generated movement information and a location of a target pixel comprised in the second image; and changing a value of the target pixel by blending a value of the selected at least one pixel with the value of the target pixel according to a preset weight.

15 Claims, 12 Drawing Sheets

(51) Int. Cl.
  G06F 3/01      (2006.01)
  H04N 13/117    (2018.01)
  G06T 7/285     (2017.01)
  H04N 13/344    (2018.01)
  H04N 13/371    (2018.01)
  G06T 7/223     (2017.01)
  H04N 13/15     (2018.01)
  H04N 13/378    (2018.01)
  G06T 15/08     (2011.01)

(52) U.S. Cl.
  CPC .............. *G06F 3/012* (2013.01); *G06T 7/223* (2017.01); *G06T 7/285* (2017.01); *G06T 15/08* (2013.01); *G06T 19/00* (2013.01); *H04N 13/117* (2018.05); *H04N 13/15* (2018.05); *H04N 13/344* (2018.05); *H04N 13/371* (2018.05); *H04N 13/378* (2018.05); *G02B 2027/014* (2013.01); *G02B 2027/0178* (2013.01)

(56) References Cited

U.S. PATENT DOCUMENTS

| 9,747,726 | B2  | 8/2017  | Williams et al. | |
|---|---|---|---|---|
| 9,824,498 | B2* | 11/2017 | Mallinson | G06T 19/006 |
| 2009/0135189 | A1 | 5/2009 | Kim et al. | |
| 2013/0011020 | A1* | 1/2013 | Kamoshida | H04N 5/2329 382/107 |
| 2016/0071246 | A1* | 3/2016 | Uralsky | G06T 11/40 345/611 |
| 2016/0163099 | A1 | 6/2016 | Foo et al. | |
| 2016/0189429 | A1 | 6/2016 | Mallinson | |
| 2017/0118458 | A1* | 4/2017 | Gronholm | H04N 13/156 |

FOREIGN PATENT DOCUMENTS

| KR | 10-2011-0092781 A | 8/2011 |
|---|---|---|
| KR | 10-2014-0141392 A | 12/2014 |
| KR | 10-2015-0040559 A | 4/2015 |
| KR | 10-2015-0084925 A | 7/2015 |
| KR | 10-2016-0033763 A | 3/2016 |
| WO | 2014010817 A1 | 1/2014 |
| WO | 2015/155406 A1 | 10/2015 |

OTHER PUBLICATIONS

International Search Report (PCT/ISA/210), issued by International Searching Authority in corresponding International Application No. PCT/KR2017/008107, dated Nov. 2, 2017.
Communication dated Jun. 26, 2019, issued by the European Patent Office in counterpart European Application No. 17834791.0.
Communication dated Aug. 3, 2020 issued by the Korean Intellectual Property Office in counterpart Korean Application No. 10-2016-0095995.

* cited by examiner

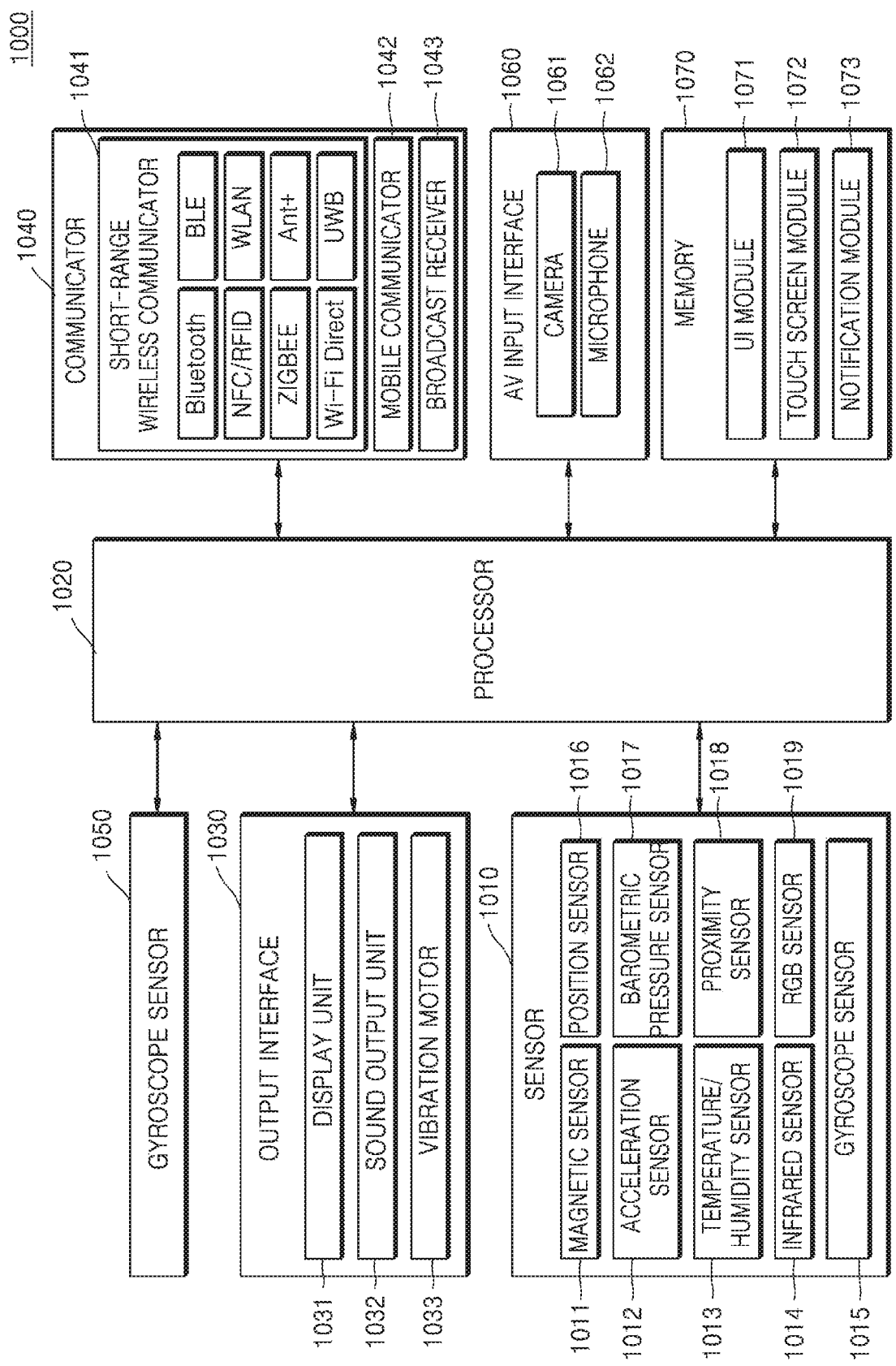

METHOD AND DEVICE FOR PROCESSING IMAGE, AND RECORDING MEDIUM

TECHNICAL FIELD

Disclosed embodiments relate to a method of processing an image, a device for processing an image, and a recording medium having recorded thereon a program for performing the method of processing an image.

BACKGROUND ART

Recently, various technologies of providing an image for a user to experience virtual reality (VR) are being developed. Such VR experience technologies may be implemented via a device including a head-mounted display (HMD) or the like configured to allow a user to experience VR by changing an output image according to the user's eyes by using lenses. In this regard, to output an image corresponding to a direction of a gaze of a user, a device providing VR may sense movement of the user.

In a case of a device providing VR, a user usually wears the device on a body part such as his/her head, and thus, the device may sense movement that is not intended by the user. In this case, the movement that is not intended by the user may be reflected in rendering of an image such that the image may be distorted.

DESCRIPTION OF EMBODIMENTS

Technical Problem

Provided are a method and device for processing an image, and a recording medium, in which movement of a user wearing the device is tracked, and values of pixels constituting an image are compensated for according to the tracked movement, such that it is possible to prevent the image from being distorted due to the movement of the user.

Solution To Problem

According to an aspect of the present disclosure, a method, performed by a device, of processing an image includes tracking a movement of a user wearing the device and generating movement information of the user, the movement information being about a movement occurring between a previous time when a first image was rendered and a current time when a second image is rendered; selecting at least one pixel from among a plurality of pixels included in the first image, based on the generated movement information and a location of a target pixel included in the second image; and changing a value of the target pixel by blending a value of the selected at least one pixel with the value of the target pixel according to a preset weight.

BRIEF DESCRIPTION OF DRAWINGS

FIGS. 10 and 11 are block diagrams of a device for processing an image, according to embodiments.

BEST MODE

Figure 1:
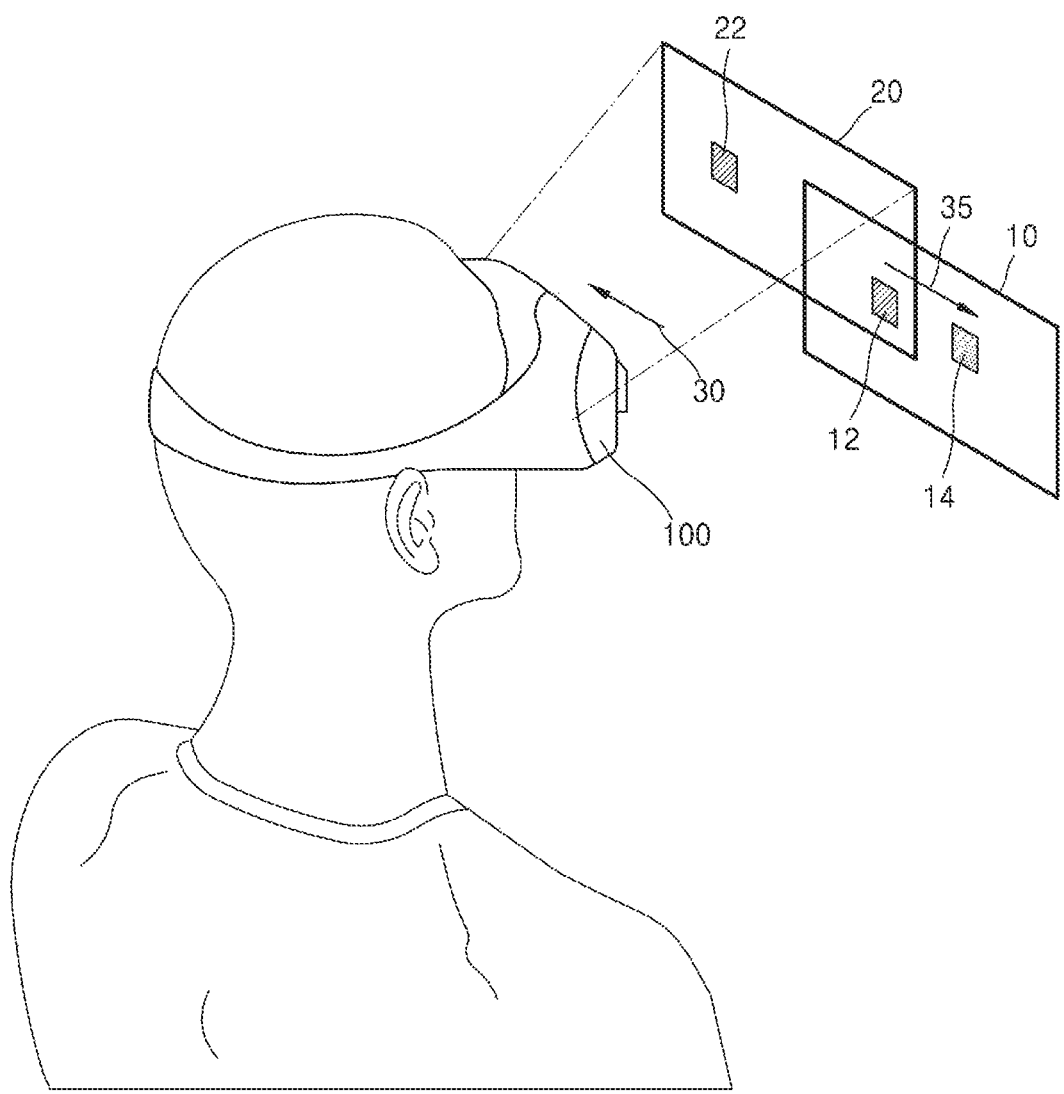
FIG. 1 is a conceptual diagram for describing a method, performed by a device, of processing an image, according to an embodiment.

According to an aspect of the present disclosure, a method, performed by a device, of processing an image includes tracking a movement of a user wearing the device and generating movement information of the user, the movement information being about a movement occurring between a previous time when a first image was rendered and a current time when a second image is rendered; selecting at least one pixel from among a plurality of pixels included in the first image, based on the generated movement information and a location of a target pixel included in the second image; and changing a value of the target pixel by blending a value of the selected at least one pixel with the value of the target pixel according to a preset weight.

The method may further include setting the weight according to a time when the selected at least one pixel is rendered, wherein the weight of the selected at least one pixel is set to be greater the closer the time when the selected at least one pixel is rendered is to a time when the target pixel is rendered.

The method may further include setting the weight according to movement of the user between a time when the selected at least one pixel is rendered and a time when the target pixel is rendered, wherein the weight of the selected at least one pixel is set to be smaller the greater the movement of the user is between the time when the selected at least one pixel is rendered and the time when the target pixel is rendered.

The method may further include determining a value of a pixel located between the selected at least one pixel and the target pixel by performing interpolation based on the movement information, wherein the changing includes changing the value of the target pixel by blending the value of the pixel, which is determined by performing the interpolation, the value of the selected at least one pixel, and the value of the target pixel according to the preset weight.

The method may further include tracking, based on the movement information, a movement path of the user in a reverse direction, and then selecting at least some pixels from among a plurality of pixels located on the movement path in an image that was previously rendered.

The method may further include determining sharpness of an image including the changed value of the target pixel; and changing the preset weight, based on a result of the determining.

The method may further include measuring movement of a head of the user, wherein the device is worn on the head.

According to another aspect of the present disclosure, a device for processing an image includes a sensor configured to track a movement of a user wearing the device and generate movement information of the user, the movement information being about a movement occurring between a previous time when a first image was rendered and a current time when a second image is rendered; a processor configured to select at least one pixel of a plurality of pixels included in the first image, based on the generated movement information and a location of a target pixel included in the second image, and change a value of the target pixel by blending a value of the selected at least one pixel with the value of the target pixel according to a preset weight; and an output interface configured to output an image including the target pixel having the changed value.

The processor may be further configured to set the weight according to a time when the selected at least one pixel is rendered, wherein the weight of the selected at least one pixel is set to be greater the closer the time when the selected at least one pixel is rendered is to a time when the target pixel is rendered.

The processor may be further configured to set the weight according to movement of the user between a time when the selected at least one pixel is rendered and a time when the target pixel is rendered, wherein the weight of the selected at least one pixel is set to be smaller the greater the movement of the user is between the time when the selected at least one pixel is rendered and the time when the target pixel is rendered.

The processor may be further configured to determine a value of a pixel located between the selected at least one pixel and the target pixel by performing interpolation based on the movement information, and change the value of the target pixel by blending the value of the pixel which is determined by performing the interpolation, the value of the selected at least one pixel, and the value of the target pixel according to the preset weight.

The processor may be further configured to track, based on the movement information, a movement path of the user in a reverse direction, and then select at least some pixels from among a plurality of pixels located on the movement path in an image that was previously rendered.

The processor may be further configured to determine sharpness of an image including the changed value of the target pixel, and change the preset weight, based on a result of the determination.

The sensor may be further configured to measure movement of a head of the user, wherein the device is worn on the head.

MODE OF DISCLOSURE

Hereinafter, terms that are used in the specification will be briefly described, and the present disclosure will be described in detail.

All terms used in the present disclosure are general terms that are selected in consideration of their functions in the disclosure and are currently widely used. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Throughout the specification, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the module may be embodied as hardware or software or embodied by combining hardware and software.

Embodiments of the present disclosure will now be described more fully with reference to the accompanying drawings for one of ordinary skill in the art to be able to perform the present disclosure without any difficulty. The present disclosure may, however, be embodied in many different forms and should not be construed as being limited to the embodiments set forth herein. In the drawings, for a more clear description of the present disclosure, parts or units that are not related to the descriptions are omitted, and throughout the specification, like reference numerals in the drawings denote like elements.

FIG. 1 is a conceptual diagram for describing a method, performed by a device 100, of processing an image, according to an embodiment.

The device 100 according to an embodiment may output an image. In this regard, the image may be a frame. However, this is only an example, and the image may be a scene configuring content such as a moving picture or the like. Also, the image output from the device 100 is projected via a lens such that virtual reality (VR) for experiencing that the image is output from a distance may be provided to a user.

When the user wears the device 100, the device 100 according to an embodiment may track movement of the user. For example, when the user wears the device 100 on his/her head, the device 100 may track movement including rotation, shaking, or the like of the head. Also, the device 100 may reflect movement of the user and then may determine an image to be rendered. For example, when a gaze of the user is changed, the device 100 may sense the changed gaze of the user and may output an image corresponding to the changed gaze of the user When the user wears the device 100, the device 100 may sense movement that is not intended by the user. For example, when the device 100 is worn on a head of the user, the device 100 may sense trembling, shaking, or the like of the head. In this case, sensed movement is reflected in rendering of an image and then values of pixels mapped to a display of the device 100 are sharply changed, such that, when the image is output, distortion in the form of jittering may occur.

To reduce distortion due to movement of a user, the device 100 according to an embodiment may compensate for, based on movement 30 of the user, a value of a target pixel 22 of a second image 20 that is currently rendered, by using a pixel 14 of a first image 10 that was previously rendered. For example, the device 100 may track movement 30 of the user which occurs between a previous time when the first image 10 was rendered and a current time when the second image 20 is rendered. Also, the device 100 may select a reference pixel 12 in the first image 10, the reference pixel 12 corresponding to the target pixel 22 of the second image 20. The device 100 may select the pixel 14 in the first image 10 by applying movement 35 of the user to the selected reference pixel 12, the movement 35 being changed in a reverse direction.

The device 100 according to an embodiment may blend the value of the target pixel 22 with a value of the selected pixel 14 according to a preset weight, and may change the value of the target pixel 22. The device 100 may apply the value of the pixel 14 selected from a previous image to the value of the target pixel 22 according to the preset weight, and thus may decrease occurrence of distortion due to a sharp change in a pixel value of a second image according to movement of the user.

As described above, the device 100 according to an embodiment may change respective values of a plurality of pixels included in the second image 20, based on movement of the user and values of pixels included in the first image 10. The second image whose values of pixels are changed is projected via a lens internally or externally arranged at the device 100, such that an environment in which the user may experience VR may be provided.

The device 100 according to an embodiment may be embodied in various forms. For example, the device 100 described throughout the specification may be, but is not limited to, a mobile phone, a smartphone, a notebook computer (a laptop computer), a tablet personal computer (tablet PC), an electronic book terminal, a terminal for digital broadcasting, a personal digital assistant (PDA), a portable multimedia player (PMP), navigation, a smart television (smart TV), a smart car, consumer electronics (CE) equipment (e.g., a refrigerator having a display panel, an air conditioner, or the like), a head-mounted display (HMD), or the like.

Figure 2:
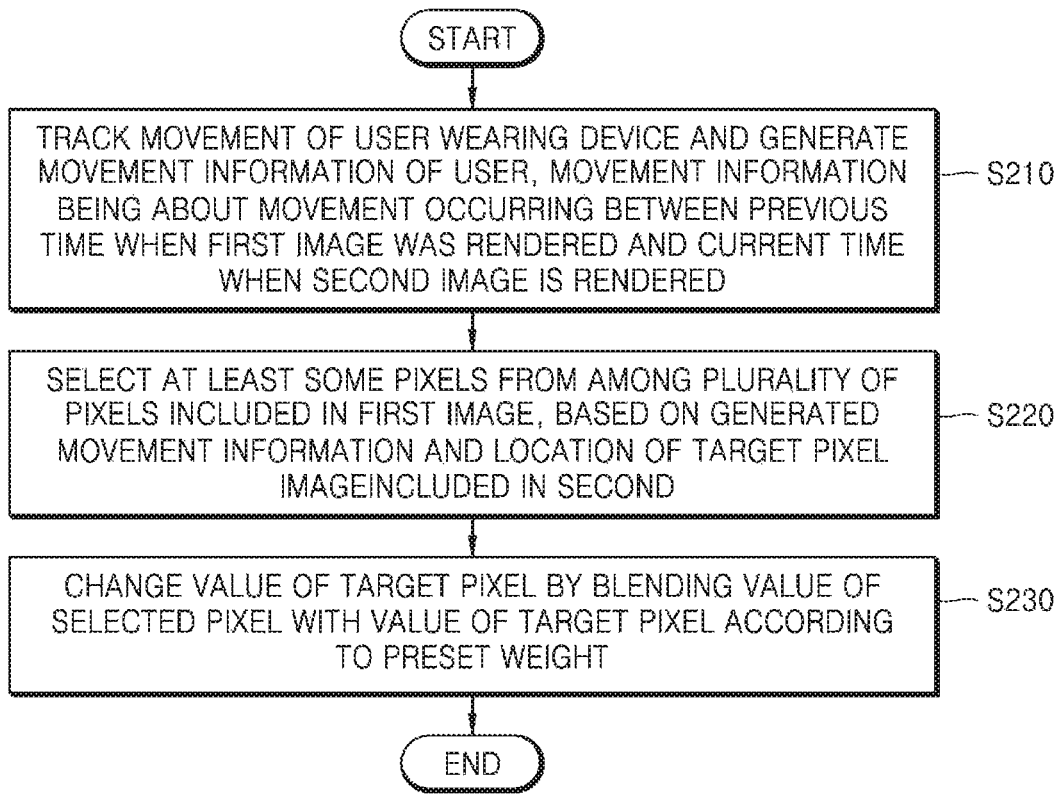
FIG. 2 is a flowchart for describing a method, performed by a device, of processing an image, according to an embodiment.

FIG. 2 is a flowchart for describing a method, performed by a device, of processing an image, according to an embodiment.

In operation S210, the device may track movement of a user wearing the device and may generate movement information of the user, the movement information being about movement occurring between a previous time when a first image was rendered and a current time when a second image is rendered.

The device according to an embodiment may sense movement such as rotation, shaking, or the like of a head of the user. Also, when a plurality of images are sequentially rendered, the device may generate movement information about movement of the head of the user, the movement being between times when the plurality of images are rendered. In this regard, the movement information may include a movement direction, acceleration, or the like of the head of the user.

The device may sense the movement of the user by using a sensor included in the device, but in another embodiment, the device may generate the movement information by receiving data indicating the movement of the user from a sensor arranged outside the device.

In operation S220, the device may select at least some pixels from among a plurality of pixels included in the first image, based on the generated movement information and a location of a target pixel included in the second image.

To decrease distortion occurred in the second image due to movement of the user, the device according to an embodiment may blend a pixel of the first image with a pixel of the second image. In this regard, the pixel of the second image will now be described as the target pixel.

The device according to an embodiment may select a reference pixel in the first image, the reference pixel corresponding to the target pixel of the second image. In this regard, a corresponding pixel may indicate a pixel that includes same information. The device may select, from the first image, a pixel to be blended with the target pixel by reversely tracking the movement information of the user from the reference pixel corresponding to the target pixel of the second image.

For example, when the user moves his/her head by a distance d1 in a right direction, the device may select, from the first image, a pixel located by the distance d1 from the reference pixel in a left direction, the reference pixel corresponding to the target pixel of the second image. However, this is only exemplary, and a method, performed by the device, of selecting a pixel to be blended with a target pixel, based on movement information, is not limited thereto. For example, a pixel to be blended with the target pixel of the second image may be selected in the first image by scaling a size of the movement information according to a preset value.

In operation S230, the device may change a value of the target pixel by blending a value of the selected pixel with the value of the target pixel according to a preset weight.

The device according to an embodiment may blend the value of the selected pixel with the value of the target pixel according to a ratio of w:1−w that is the preset weight. According to another embodiment, the device may determine a weight by which the value of the selected pixel is blended with the value of the target pixel, based on movement information. For example, the greater a movement of a head of the user is, the smaller a weight the device may set, the weight being with respect to a pixel of a previous image to be blended with a target pixel.

The device according to an embodiment may perform a blending method as described above on each of target pixels of images that are sequentially rendered, such that the value of the target pixel of the second image that is currently rendered may be blended with not only the first image but may also be blended with a value of a pixel of a previous image of the first image.

According to another embodiment, the greater a difference between a current time when the second image is rendered and rendered times when a plurality of images were previously rendered is, the smaller a weight the device may set.

According to another embodiment, the device may determine sharpness of an image including a changed value of a target pixel. In this regard, a method of determining sharpness may include all methods according to the related art. According to a result of determining the sharpness, the device may change a weight between the target pixel and a pixel selected in a previous image. For example, when the device determines that a blur phenomenon occurs to be greater than a reference value, the device may decrease the weight with respect to the pixel selected in the previous image.

Figure 3:
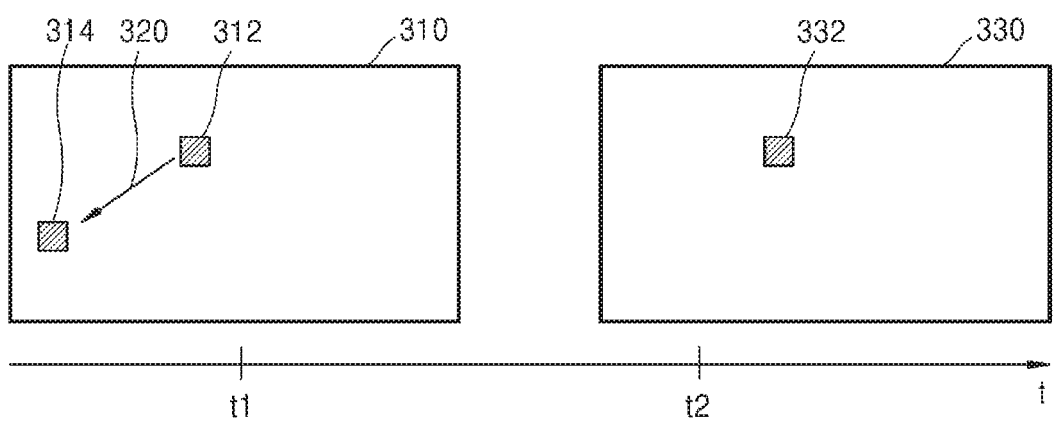
FIG. 3 is a diagram for describing a method of selecting, from a first image, a pixel to be blended with a target pixel of a second image, the method being performed by a device, according to an embodiment.

FIG. 3 is a diagram for describing a method of selecting, from a first image 310, a pixel 314 to be blended with a target pixel 332 of a second image 330, the method being performed by a device, according to an embodiment.

The device according to an embodiment may track movement of a head of a user, the movement being sensed between a previous time t1 when the first image 310 was rendered and a current time t2 when the second image 330 is rendered. The device may generate movement information including a direction, acceleration, or the like, according to the tracked movement of the head of the user.

The device according to an embodiment may select a reference pixel 312 in the first image 310 which corresponds to the target pixel 332 included in the second image 330. In this regard, the reference pixel 312 may include same information as the target pixel 332.

Also, the device may select the pixel 314 to be blended, by applying movement information 320 of movement that is changed in a reverse direction from the reference pixel 312. The device may calculate a value by blending a value of the selected pixel 314 with a value of the target pixel 332 according to a preset weight, and may change the calculated value as the value of the target pixel 332.

In the previous embodiment, the target pixel 332 is an example of compensating for a value of the second image 330, and a plurality of pixels included in the second image 330 may be respectively blended with a pixel selected in the first image 310, based on a plurality of pieces of movement information. Also, according to another embodiment, the device may detect an edge area from the second image 330, and may select, as a target pixel, pixels included in the edge area. Accordingly, only the pixels included in the edge area may be blended with the pixel selected in the first image 310, based on movement information.

Figure 4:
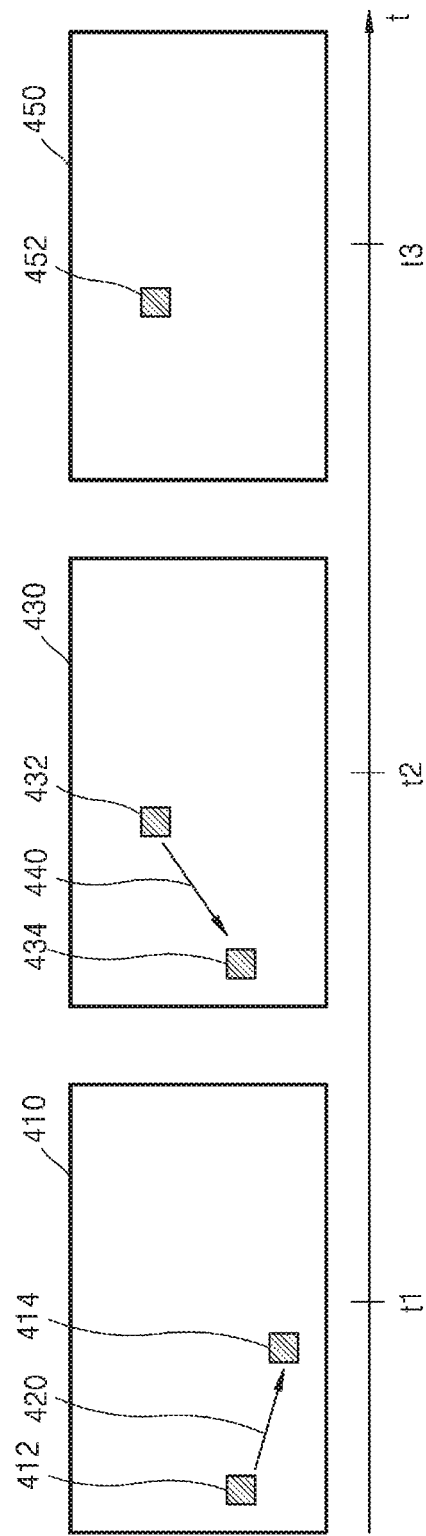
FIG. 4 is a diagram for describing a method of blending pixels of a plurality of images that are sequentially rendered, the method being performed by a device, according to an embodiment.

FIG. 4 is a diagram for describing a method of blending pixels of a plurality of images that are sequentially rendered, the method being performed by a device, according to an embodiment.

Referring to FIG. 4, the device according to an embodiment may generate movement information of a user, the movement information being about movement occurring between a time t1 when a first image 410 is rendered and a time t2 when a second image 430 is rendered. Also, the device may select, from the first image 410, a first pixel 414 to be blended from a reference pixel 412 corresponding to a target pixel 434 of the second image 430, by using movement information 420 that is changed in a reverse direction. The device may blend a value of the target pixel 434 of the second image 430 with a value of the first pixel 414 according to 1−w1:w1 that is a preset weight and then may change the value of the target pixel 434 of the second image 430. Here, in the weight, 1−w1 may be set to have a greater value than w1, but this is only exemplary and thus the present disclosure is not limited thereto.

The device may store a changed value of a pixel of the second image 430. Hereinafter, it is assumed that the second image 430 is an image having a pixel value that is changed according to the aforementioned process.

The device may generate movement information of the user, the movement information being about movement occurring between the time t2 when the second image 430 is rendered and a time t3 when a third image 450 is rendered. In this regard, t2 may indicate a time when a value of the second image 430 is changed according to the aforementioned process.

The device may select, from the second image 430, the second pixel 434 to be blended from a reference pixel 432 corresponding to a target pixel 452 of the third image 450, by using movement information 440 that is changed in a reverse direction. The device may blend a value of the target pixel 452 of the third image 450 with the value of the selected second pixel 434 according to 1−w2:w2 that is a preset weight, and then may change the value of the target pixel 452 of the third image 450. Here, in the weight, 1−w2 may be set to have a greater value than w2, but this is only exemplary and thus the present disclosure is not limited thereto.

The pixel 434 that is a blending target in the second image 430 has a value of the second pixel 434 of the second image 430, the value being not changed, and a value of the selected first pixel 414 of the first image 410, the value being blended according to 1−w1:w1. Accordingly, the target pixel 452 of the third image 450 may be changed to a value obtained by blending the value of the target pixel 452 of the third image 450, the not-changed value of the second pixel 434 of the second image 430, and the value of the first pixel 414 of the first image 410 according to a weight of 1−w1:(1−w1)w2:w1w2. Referring to the calculated weight, when the device performs blending on a pixel of a previous image selected based on movement information, a weight with respect to the pixel of the previous image whose rendered time is greatly different from a current time, the pixel being to be blended, may be set to be small.

However, this is only exemplary, and in the disclosed embodiment, a method of setting a weight is not limited thereto.

Figure 5:
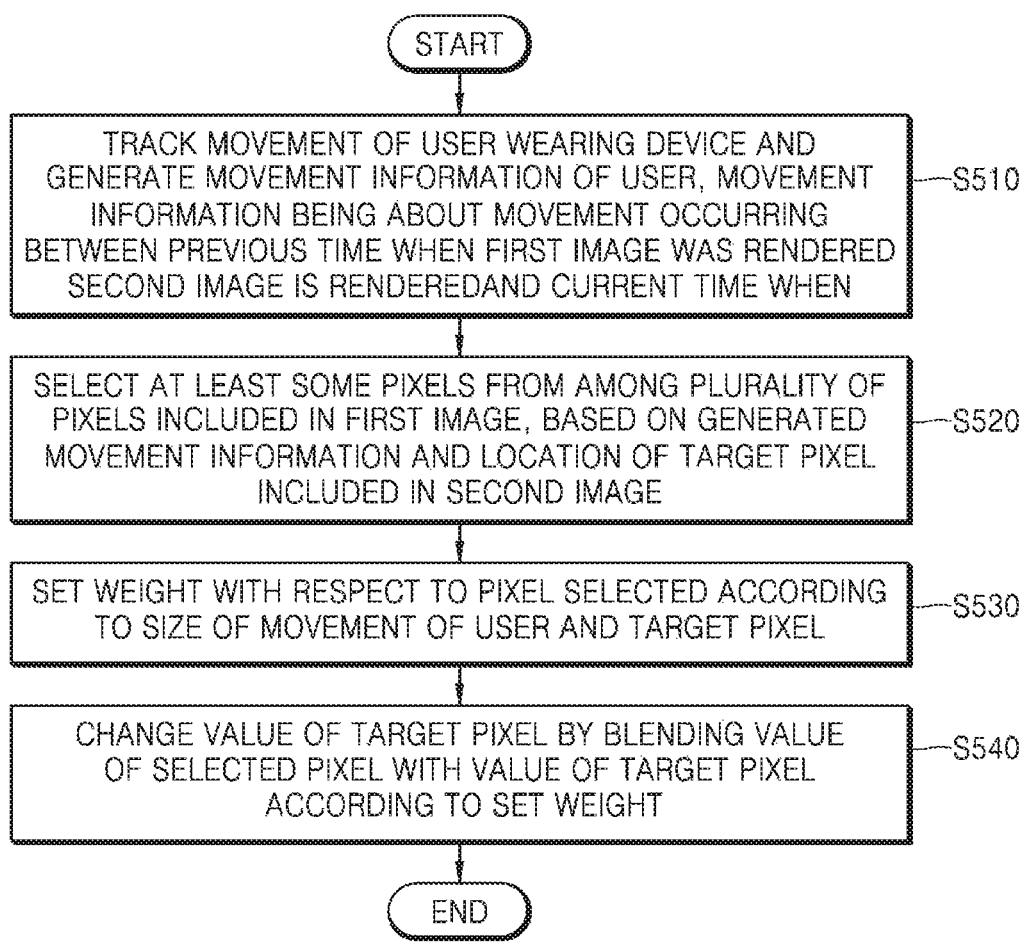
FIG. 5 is a flowchart for describing a method of determining, according to movement information, a weight by which pixels are blended, the method being performed by a device, according to an embodiment.

FIG. 5 is a flowchart for describing a method of determining, according to movement information, a weight by which pixels are blended, the method being performed by a device, according to an embodiment.

In operation S510, the device may track movement of a user wearing the device and may generate movement information of the user, the movement information being about movement occurring between a previous time when a first image was rendered and a current time when a second image is rendered.

Operation S510 may correspond to operation S210 described above with reference to FIG. 2.

In operation S520, the device may select at least some pixels from among a plurality of pixels included in the first image, based on the generated movement information and a location of a target pixel included in the second image.

Operation S520 may correspond to operation S220 described above with reference to FIG. 2.

In operation S530, the device may set a weight with respect to a pixel selected according to a size of the movement of the user and the target pixel.

The greater a movement of a head of the user is, the movement occurring between a time when the selected pixel is rendered and a time when the target pixel is rendered, the smaller a weight the device according to an embodiment may set, the weight being with respect to the pixel selected in a previously-rendered image. Also, when movement of the head of the user is small between the time when the selected pixel is rendered and the time when the target pixel is rendered, the device according to an embodiment may set a weight to be high, the weight being with respect to the pixel selected in the previously-rendered image. This will be described in detail with reference to FIG. 6.

In operation S540, the device may change a value of the target pixel by blending a value of the selected pixel with the value of the target pixel according to the set weight.

The device may perform a process of operations S510 to S530 on each of a plurality of pixels included in the second image, thereby outputting an image having a changed pixel value. The image output from the device may be projected via a lens having a preset angle of view and arranged inside or outside the device.

Figure 6A:
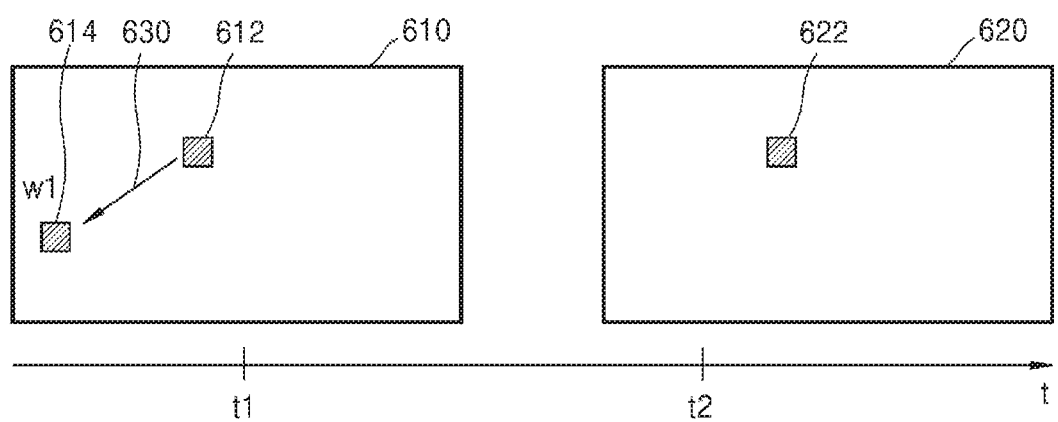
FIGS. 6A and 6B are diagrams for describing a method of determining, according to movement information, a weight by which pixels are blended, the method being performed by a device, according to an embodiment.
Figure 6B:
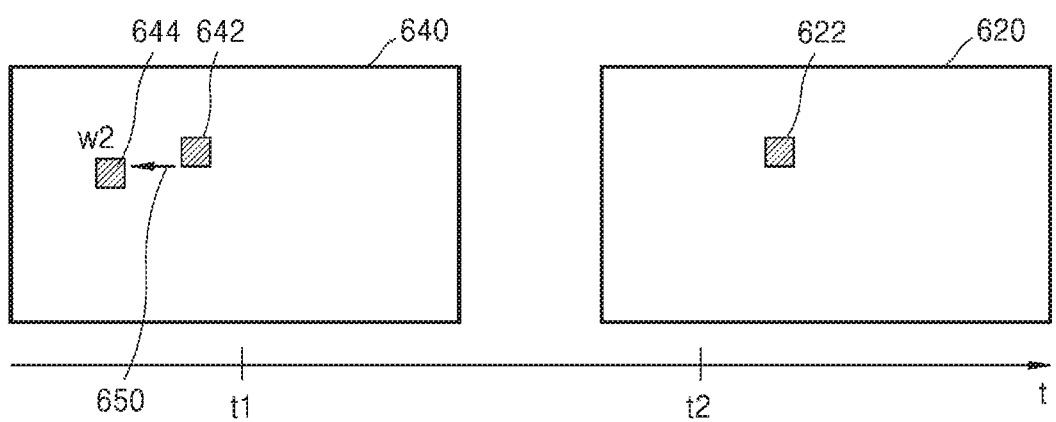

FIGS. 6A and 6B are diagrams for describing a method of determining, according to movement information, a weight by which pixels are blended, the method being performed by a device, according to an embodiment.

Referring to FIG. 6A, the device according to an embodiment may track movement of a hear part of a user, the movement being sensed between a previous time t1 when a first image 610 was rendered and a current time t2 when a second image 620 is rendered. The device may select a pixel 614 by applying movement information 630 that is changed in a reverse direction from a reference pixel 612 in the first image 610, the reference pixel 612 corresponding to a target pixel 622 in the second image 620. The device may change a value of the target pixel 622 as a value obtained by blending a value of the selected pixel 614 with the value of the target pixel 622 by applying a weight of w1:1−w1 thereto.

Referring to FIG. 6B, in a same manner as described above with reference to FIG. 6A, the device may select a pixel 644 by applying movement information 650 that is changed in a reverse direction from a reference pixel 642 in a first image 640, the reference pixel 642 corresponding to the target pixel 622. The device may change the value of the target pixel 622 as a value obtained by blending a value of the selected pixel 644 with the value of the target pixel 622 by applying a weight of w2:1−w2 thereto. In this regard, because the device determines that a degree of the movement of the head of the user which is sensed in the embodiment of FIG. 6B is less than a degree of the movement of the head of the user which is sensed in the embodiment of FIG. 6A, the device may set a value of w2 to be higher than w1 that is a weight in FIG. 6A.

Figure 7:
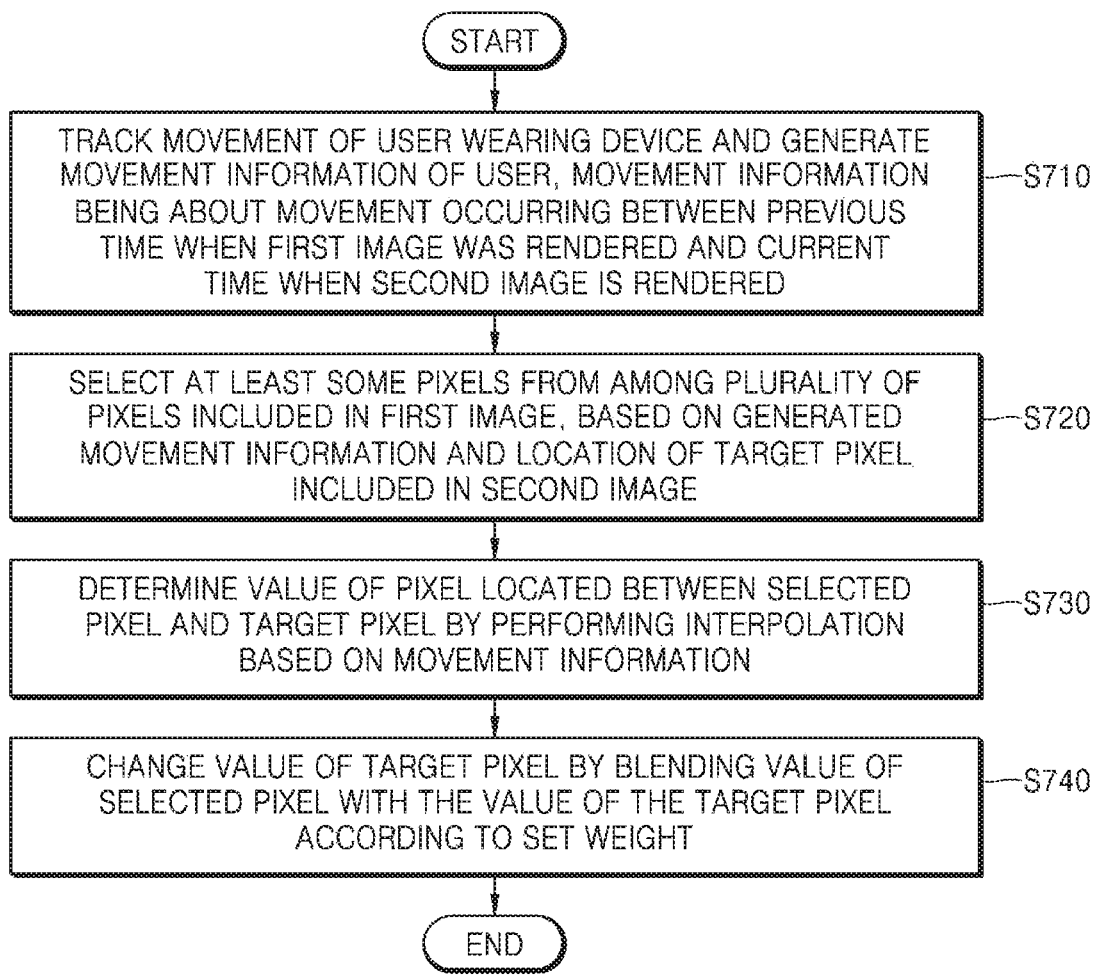
FIG. 7 is a flowchart for describing a method, performed by a device, of changing a value of a target pixel by performing interpolation on a pixel selected from a first image based on a target pixel of a second image and movement of a user, according to an embodiment.

FIG. 7 is a flowchart for describing a method, performed by a device, of changing a value of a target pixel by performing interpolation on a pixel selected from a first image based on a target pixel of a second image and movement of a user, according to an embodiment.

In operation S710, the device may track movement of the user wearing the device and may generate movement information of the user, the movement information being about the movement occurring between a previous time when a first image was rendered and a current time when a second image is rendered.

Operation S710 may correspond to operation S210 described above with reference to FIG. 2.

In operation S720, the device may select at least some pixels from among a plurality of pixels included in the first image, based on the generated movement information and a location of a target pixel included in the second image.

Operation S720 may correspond to operation S220 described above with reference to FIG. 2.

In operation S730, the device may determine a value of a pixel located between the selected pixel and the target pixel by performing interpolation based on the movement information.

The device according to an embodiment may determine the value of the pixel located between the selected pixel and the target pixel by performing interpolation on the selected pixel and the target pixel according to a determined path of the movement of a head of the user, the determined path being indicated by the movement information. This will be described in detail with reference to FIG. 8.

Figure 8:
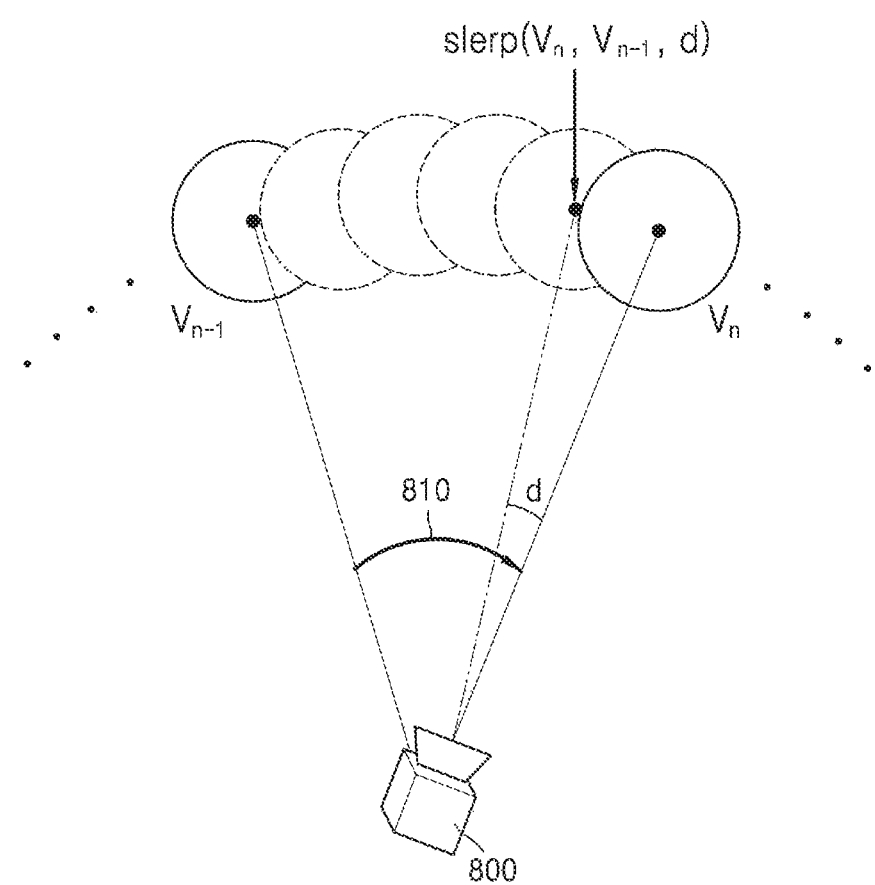
FIG. 8 is a diagram for describing a method, performed by a device, of determining a value of a previously-rendered pixel by performing interpolation according to a movement path, according to an embodiment.

FIG. 8 is a diagram for describing a method, performed by a device 800, of determining a value of a previously-rendered pixel by performing interpolation according to a movement path, according to an embodiment.

Referring to FIG. 8, the device 800 may perform interpolation based on movement information and then may determine a color of a pixel sensed by a user between a previous time when a first image was rendered and a current time when a second image is rendered.

The device 800 according to an embodiment may compare Vn to Vn−1, wherein Vn indicates viewpoint information of a user at the current time when the second image is rendered and Vn−1 indicates viewpoint information of the user at the previous time when the first image was rendered. In this regard, Vn and Vn−1 may be viewpoint matrixes respectively indicating viewpoints of the user. Vn−1 may indicate viewpoint information of the user at a time when the first image is output. The device 800 may determine a movement path 810 of a head of the user, based on Vn and Vn−1.

The device 800 according to an embodiment may determine a ratio of Vn to Vn−1 as d. In this regard, d may be determined to be a value between 0 and 1. The device 800 may determine, according to Equation 1 below, $s_d$ that is a location of a pixel when the head rotates by d from Vn that is a current viewpoint matrix in a direction of Vn−1 that is a previous viewpoint matrix.

$$s_d = P \cdot slerp(V_n, V_n, d) \cdot V_n^{-1} \cdot v_p \quad \text{[Equation 1]}$$

In Equation 1 above, $slerp(V_n, V_n, d)$ is a spherical linear interpolation function to calculate an intermediate viewpoint matrix between Vn and Vn−1. Also, $v_p$ indicates a location of a target pixel, and P indicates a camera projection matrix.

The device 800 according to an embodiment may reflect movement of the head of the user, may perform interpolation and then may determine values of pixels that were seen before the current time when the second image is rendered. Also, the device 800 may blend determined colors according to Equation 2 below. In Equation 2 below, it is assumed that the device 800 determines values of n previously-rendered pixels located on a movement path.

$$C_{acc} = \sum_0^{n-1} \frac{d_i}{s_d} \cdot C(s_i) \quad \text{[Equation 2]}$$

In Equation 2 above, $d_i$ indicates a degree of relative closeness with respect to the current viewpoint matrix and may have a value between 0 and 1. Also, $s_d$ indicates a sum of $d_0$ to $d_{n-1}$, and $s_i$ indicates a location of a previously-rendered pixel located on the movement path, the location being calculated according to Equation 1. Also, $C(s_i)$ indicates a function to return a value of a pixel by receiving an input of a location of the pixel, and $C_{acc}$ indicates a value calculated by blending the values of the n previously-rendered pixels located on the movement path.

The device 800 according to an embodiment may blend the value calculated by blending the values of the n previously-rendered pixels with a value of the target pixel according to a preset weight. In this regard, the weight may be determined according to Equation 3 below.

$$a = bx^c + 0.5 \ \{\text{if } x > X_{threshold}, \ a = 1\} \quad \text{[Equation 3]}$$

In Equation 3 above, a may indicate a weight, x may indicate an angular velocity of rotation of the head of the user, and b may be a coefficient for determining a scale of an angular velocity of a graph. Also, c may be a coefficient for determining a gradient of the graph, and $X_{threshold}$ may be a threshold value that is preset with respect to an angular velocity of rotation. According to an embodiment, a minimum value of a may be set as 0.5 and a maximum value thereof may be set as 1.

The device 800 according to an embodiment may determine a varying value of the target pixel according to Equation 4 below.

$$C_{res} = \qquad \text{[Equation 4]}$$
$$(1-a) \cdot \sum_{0}^{n-1} \frac{d_i}{s_d} \cdot C(P \cdot slerp(V_n, V_n, d) \cdot V_n^{-1} \cdot v_p) + aC(s_c)$$

In Equation 4 above, Sc may indicate a value of the target pixel, and Cres may indicate a changed value of the target pixel.

As described above, the device 800 may blend a value of a current target pixel with values of pixels that were present on a movement path of the user by performing interpolation based on the movement information, such that the device 800 may decrease distortion of an image due to movement of the user.

In operation S740, the device may change a value of the target pixel by blending a value of the selected pixel with the value of the target pixel according to a set weight.

The device may perform a process of operations S710 to S730 on each of a plurality of pixels included in the first image, thereby outputting an image having a changed pixel value. The image output from the device may be projected via a lens having a preset angle of view and arranged inside or outside the device FIG. 9 is a diagram for describing a method, performed by a device, of changing a value of a target pixel 922 by performing interpolation on a pixel 914 selected from a first image 910 and the target pixel 922 of a second image 920, based on movement of a user, according to an embodiment.

Figure 9:
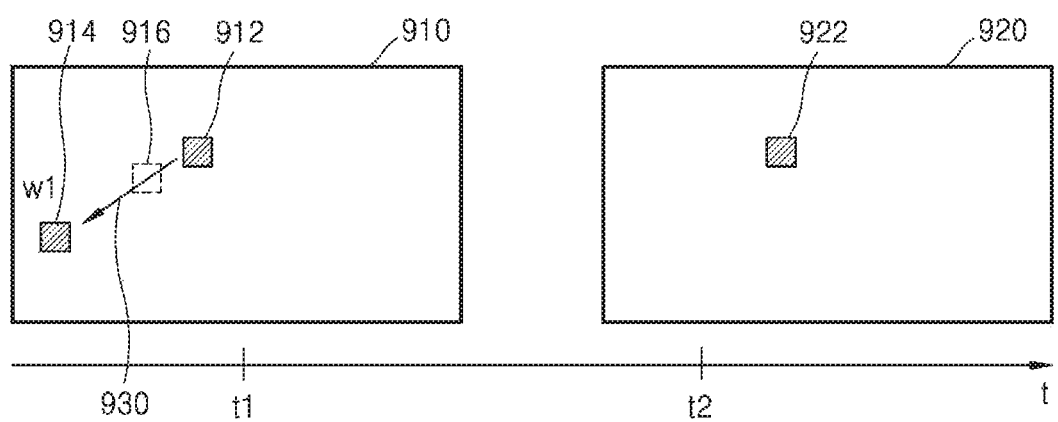
FIG. 9 is a diagram for describing a method, performed by a device, of changing a value of a target pixel by performing interpolation on a pixel selected from a first image and the target pixel of a second image, based on movement of a user, according to an embodiment.

Referring to FIG. 9, the device according to an embodiment may sense movement of the user who wears the device and may generate movement information. Also, the device may select, from the first image 910, a first pixel 914 to be blended, by applying movement information 930 of movement that is changed in a reverse direction from a reference pixel 912 corresponding to the target pixel 922 of the second image 920.

The device may determine a value of a second pixel 916 located between the first pixel 914 and the target pixel 912, the second pixel 916 being selected by performing interpolation based on the movement information. In this regard, a method of determining the value of the second pixel 916 may correspond to the descriptions provided with reference to FIG. 8.

The device according to an embodiment may change the value of the target pixel 922 by blending the determined value of the second pixel 916, the value of the selected first pixel 934, and the value of the target pixel 922.

Figure 10:
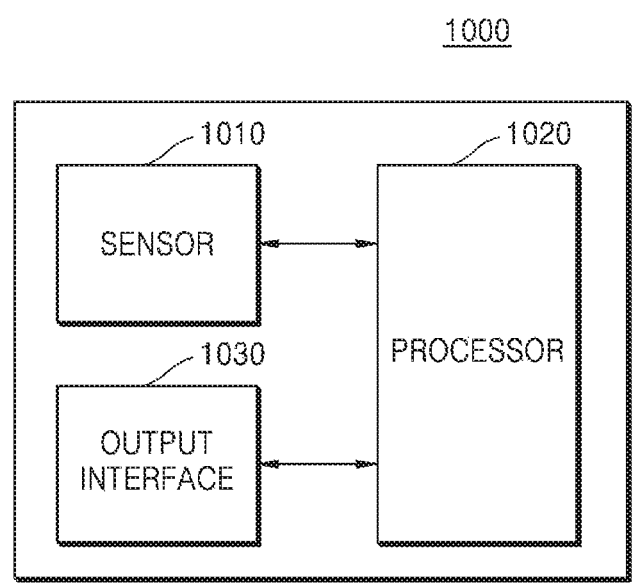

FIGS. 10 and 11 are block diagrams of a device 1000 for processing an image, according to embodiments.

As illustrated in FIG. 10, the device 1000 according to an embodiment may include a sensor 1010, a processor 1020, and an output interface 1030. However, not all shown elements are necessary elements. The device 1000 may be embodied with more elements than the shown elements or may be embodied with fewer elements than the shown elements.

For example, as illustrated in FIG. 11, the device 1000 according to an embodiment may include a communicator 1040, a user input interface 1050, an audio/video (AV) input interface 1060, and a memory 1070, in addition to the sensor 1010, the processor 1020, and the output interface 1030.

Hereinafter, the elements are sequentially described below.

The sensor 1010 may sense at least one of a state of the device 1000, a state of surroundings of the device 1000, and a state of a user wearing the device 1000, and may transmit sensed information to the processor 1020.

The sensor 1010 according to an embodiment may track movement of the user wearing the device 1000. For example, the sensor 1010 may measure movement of a head of the user, wherein the device 1000 is worn on the head. Also, the sensor 1010 may generate, based on the measured movement, movement information of the user between a previous time when a first image was rendered and a current time when a second image is rendered.

The sensor 1010 may include, but is not limited to, at least one of an image sensor 1011, an acceleration sensor 1012, a temperature/humidity sensor 1013, an infrared sensor 1014, a gyroscope sensor 1015, a position sensor (e.g., a global positioning system (GPS)) 1016, a barometric pressure sensor 1017, a proximity sensor 1018, and an RGB sensor (i.e., a luminance sensor) 1019. Functions of the sensors may be intuitively deduced by one of ordinary skill in the art by referring to names of the sensors, and thus, detailed descriptions thereof are omitted here.

The processor 1020 generally controls all operations of the device 1000. For example, the processor 1020 may generally control the sensor 1010, the output interface 1030, the communicator 1040, the user input interface 1050, the AV input interface 1060, and the memory 1070 by executing programs stored in the memory 1070.

The processor 1020 according to an embodiment may select at least some pixels from among a plurality of pixels included in the first image, based on the generated movement information and a location of a target pixel included in the second image. Also, the processor 1020 may change a value of the target pixel by blending a value of the selected pixel with the value of the target pixel according to a preset weight.

The processor 1020 according to an embodiment may set the weight according to a time when the selected pixel was rendered. In this regard, the weight of the selected pixel may be set to be greater the closer the time when the selected pixel is rendered is to a time when the target pixel is rendered.

The processor 1020 according to an embodiment may set the weight according to movement of the user between the time when the selected pixel is rendered and the time when the target pixel is rendered. In this regard, the weight of the selected pixel may be set to be smaller the greater the movement of the user between the time when the selected pixel is rendered and the time when the target pixel is rendered.

The processor 1020 according to an embodiment may determine a value of a pixel located between the selected pixel and the target pixel by performing interpolation based on the movement information. Also, the processor 1020 may change the value of the target pixel by blending the value of the pixel which is determined by performing interpolation, the value of the selected pixel, and the value of the target pixel according to a preset ratio.

The processor 1020 according to an embodiment may track, based on the movement information, a movement path of the user in a reverse direction, and then may select at least some pixels from among a plurality of pixels located on the movement path in an image that was previously rendered.

The processor 1020 according to an embodiment may determine sharpness of an image including the changed value of the target pixel, and may change the weight according to a result of the determination.

The output interface 1030 may output an audio signal, a video signal, or a vibration signal, and may include a display unit 1031, a sound output unit 1032, a vibration motor 1033, or the like.

The display unit 1031 displays and outputs information processed in the device 1000. For example, the display unit 1031 may output the image including the target pixel having the changed value that is calculated by the processor 1020.

When the display unit 1031 and a touch pad form a mutual layer structure and then are formed as a touch screen, the display unit 1031 may be used as both an output device and input device. The display unit 1031 may include at least one of liquid crystal display (LCD), a thin film transistor-liquid crystal display (TFT-LCD), an organic light-emitting diode (OLED) display, a flexible display, a three-dimensional (3D) display, and an electrophoretic display. According to a type of the device 1000, the device 1000 may include at least two display units 1031. Here, the at least two display units 1031 may be disposed to face each other by using a hinge.

The sound output unit 1032 may output audio data that is received from the communicator 1040 or is stored in the memory 1070. The sound output unit 1032 may also output a sound signal (e.g., a call signal receiving sound, a message receiving sound, a notifying sound, or the like) related to capabilities performed by the device 1000. The sound output unit 1032 may include a speaker, a buzzer, or the like.

The vibration motor 1033 may output a vibration signal. For example, the vibration motor 1033 may output the vibration signal that corresponds to an output of the audio data or video data. When a touch is input to the touch screen, the vibration motor 1033 may output a vibration signal.

The communicator 1040 may include one or more elements allowing communication between the device 1000 and an external device (e.g., an HMD). For example, the communicator 1040 may include a short-range wireless communicator 1041, a mobile communicator 1042, and a broadcast receiver 1043.

The short-range wireless communicator 1041 may include, but is not limited to, a Bluetooth communicator, a Bluetooth Low Energy (BLE) communicator, a near field communication (NFC) unit, a WLAN (Wi-Fi) communicator, a ZigBee communicator, an infrared Data Association (IrDA) communicator, a Wi-Fi Direct (WFD) communicator, a ultra wideband (UWB) communicator, and an Ant+ communicator.

The mobile communicator 1042 exchanges a wireless signal with at least one of a base station, an external terminal, and a server on a mobile communication network. The wireless signal may include various types of data according to communication of a sound call signal, a video call signal, or a text/multimedia message.

The broadcast receiver 1043 receives a broadcast signal and/or information related to a broadcast from the outside through a broadcast channel. The broadcast channel may include a satellite channel and a ground wave channel. In another embodiment, the device 1000 may not include the broadcast receiver 1043.

The user input interface 1050 refers to a unit through which the user inputs data to control the device 1000. For example, the user input interface 1050 may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch.

The user input interface 1050 may receive a user input. Also, the user input interface 1050 may interoperate with a user interface (UI) module 1071, thereby receiving a user input of selecting at least one of items displayed on respective sensing areas of a plurality of sensors. However, this is only exemplary and thus a type of the user input received by the user input interface 1050 is not limited thereto.

The AV input interface 1060 may receive an input of an audio signal or a video signal and may include a camera 1061 and a microphone 1062. The camera 1061 may obtain an image frame such as a still image or a moving picture via an image sensor during a video call mode or an image-capturing mode. An image that is captured via the image sensor may be processed by the processor 1020 or a separate image processing unit (not shown).

The image frame that is processed by the camera 1061 may be stored in the memory 1070 or may be transmitted to an external source via the communicator 1040. According to a configuration of the device 1000, two or more cameras 1061 may be arranged.

The microphone 1062 receives an input of an external sound signal and processes the received sound signal into electrical voice data. For example, the microphone 1062 may receive a sound signal from an external device or a speaker. To remove noise that occurs while the sound signal is being externally input, the microphone 1062 may use various noise removing algorithms.

The device 1000 according to an embodiment may further include a lens (not shown). The user of the device 1000 may recognize an image output by the display unit 1031 via the lens.

The memory 1070 may store a program for processing and controlling the processor 1020, and may store a plurality of items of input/output data (e.g., pixel values of images).

The memory 1070 may include a storage medium of at least one type selected from a flash memory, a hard disk, a multimedia card type memory, a card type memory such as a secure digital (SD) or xD-Picture (xD) card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. The device 1000 may run web storage or a cloud server that performs a storage function of the memory 1070 on the Internet.

The programs stored in the memory 1070 may be classified into a plurality of modules according to their functions, for example, into the UI module 1071, a touch screen module 1072, a notification module 1073, or the like.

The UI module 1071 may provide a specialized UI or graphical user interface (GUI) associated with the device 1000 for each application. The touch screen module 1072 may detect a user's touch gesture on the touch screen and may transmit information related to the touch gesture to the processor 1020. The touch screen module 1072 according to an embodiment may recognize and analyze a touch code. The touch screen module 1072 may be configured as separate hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The notification module 1073 may generate a signal for notifying the user about an occurrence of an event in the device 1000. Examples of the event that may occur in the device 1000 include a key signal input, or the like. The notification module 1073 may output an alarm signal in the form of a video signal via the display unit 1031, an alarm signal in the form of an audio signal via the sound output unit 1032, or an alarm signal in the form of a vibration signal via the vibration motor 1033.

The methods according to the embodiments can be embodied as programmed commands to be executed in various computer means, and then can be recorded to a computer-readable recording medium. The computer readable recording medium may include any and all combinations of one or more of the programmed commands, data files, data structures, or the like. The programmed commands recorded to the computer-readable recording medium may be particularly designed or configured for the disclosure or may be well known to one of ordinary skill in the art. Examples of the computer-readable recording medium include magnetic media including hard disks, magnetic tapes, and floppy disks, optical media including CD-ROMs, and DVDs, magneto-optical media including floptical disks, and a hardware apparatus designed to store and execute the programmed commands in read-only memory (ROM), random-access memory (RAM), flash memories, and the like. Examples of the programmed commands include not only machine code generated by a compiler but also include a high-level programming language to be executed in a computer by using an interpreter.

While one or more embodiments of the present disclosure have been described above, it will be understood by those of ordinary skill in the art that various changes in form and details may be made therein without departing from the spirit and scope as defined by the following claims.

The invention claimed is:

1. A method, performed by a device, of processing an image, the method comprising:
   tracking a movement of a user wearing the device and generating movement information of the user, the movement information being about a movement occurring between a previous time when a first image was rendered and a current time when a second image is rendered;
   selecting at least one pixel from among a plurality of pixels comprised in the first image, based on the generated movement information and a location of a target pixel comprised in the second image; and
   changing a value of the target pixel by blending a value of the selected at least one pixel with the value of the target pixel according to a preset weight.

2. The method of claim 1, further comprising setting the preset weight according to a time when the selected at least one pixel is rendered,
   wherein the preset weight of the selected at least one pixel is set to be greater the closer the time when the selected at least one pixel is rendered is to a time when the target pixel is rendered.

3. The method of claim 1, further comprising setting the preset weight according to movement of the user between a time when the selected at least one pixel is rendered and a time when the target pixel is rendered,
   wherein the preset weight of the selected at least one pixel is set to be smaller the greater the movement of the user is between the time when the selected at least one pixel is rendered and the time when the target pixel is rendered.

4. The method of claim 1, further comprising determining a value of a pixel located between the selected at least one pixel and the target pixel by performing interpolation based on the movement information,
   wherein the changing comprises changing the value of the target pixel by blending the value of the pixel, which is determined by performing the interpolation, the value of the selected at least one pixel, and the value of the target pixel according to the preset weight.

5. The method of claim 1, further comprising tracking, based on the movement information, a movement path of the user in a reverse direction, and then selecting at least some pixels from among a plurality of pixels located on the movement path in an image that was previously rendered.

6. The method of claim 1, further comprising:
   determining sharpness of an image comprising the changed value of the target pixel; and
   changing the preset weight, based on a result of the determining.

7. The method of claim 1, further comprising measuring movement of a head of the user, wherein the device is worn on the head.

8. A device for processing an image, the device comprising:
   a sensor configured to track a movement of a user wearing the device and generate movement information of the user, the movement information being about a movement occurring between a previous time when a first image was rendered and a current time when a second image is rendered;
   a processor configured to select at least one pixel of a plurality of pixels comprised in the first image, based on the generated movement information and a location of a target pixel comprised in the second image, and change a value of the target pixel by blending a value of the selected at least one pixel with the value of the target pixel according to a preset weight; and
   an output interface configured to output an image comprising the target pixel having the changed value.

9. The device of claim 8, wherein the processor is further configured to set the preset weight according to a time when the selected at least one pixel is rendered,
   wherein the preset weight of the selected at least one pixel is set to be greater the closer the time when the selected at least one pixel is rendered is to a time when the target pixel is rendered.

10. The device of claim 8, wherein the processor is further configured to set the preset weight according to movement of the user between a time when the selected at least one pixel is rendered and a time when the target pixel is rendered, wherein the preset weight of the selected at least one pixel is set to be smaller the greater the movement of the user is between the time when the selected at least one pixel is rendered and the time when the target pixel is rendered.

11. The device of claim 8, wherein the processor is further configured to determine a value of a pixel located between the selected at least one pixel and the target pixel by performing interpolation based on the movement information, and change the value of the target pixel by blending the value of the pixel which is determined by performing the interpolation, the value of the selected at least one pixel, and the value of the target pixel according to the preset weight.

12. The device of claim 8, wherein the processor is further configured to track, based on the movement information, a movement path of the user in a reverse direction, and then select at least some pixels from among a plurality of pixels located on the movement path in an image that was previously rendered.

13. The device of claim 8, wherein the processor is further configured to determine sharpness of an image comprising the changed value of the target pixel, and change the preset weight, based on a result of the determination.

14. The device of claim 8, wherein the sensor is further configured to measure movement of a head of the user, wherein the device is worn on the head.

15. A non-transitory computer-readable recording medium having recorded thereon a program for executing a method of processing an image on a computer, the method including:

tracking a movement of a user wearing a device and generating movement information of the user, the movement information being about a movement occurring between a previous time when a first image was rendered and a current time when a second image is rendered;

selecting at least one pixel from among a plurality of pixels comprised in the first image, based on the generated movement information and a location of a target pixel comprised in the second image; and changing a value of the target pixel by blending a value of the selected at least one pixel with the value of the target pixel according to a preset weight.

* * * * *